United States Patent [19]
Johnson

[11] Patent Number: 5,936,069
[45] Date of Patent: *Aug. 10, 1999

[54] PROCESS FOR PRODUCING IMPROVED SOY PROTEIN CONCENTRATE FROM GENETICALLY-MODIFIED SOYBEANS

[75] Inventor: Lawrence A. Johnson, Ames, Iowa

[73] Assignee: Iowa State University Research Foundation, Ames, Iowa

[*] Notice: This patent issued on a continued prosecution application filed under 37 CFR 1.53(d), and is subject to the twenty year patent term provisions of 35 U.S.C. 154(a)(2).

[21] Appl. No.: 08/760,037

[22] Filed: Dec. 4, 1996

Related U.S. Application Data

[60] Provisional application No. 60/009,512, Dec. 6, 1995.

[51] Int. Cl.[6] .................................................. A23J 1/14
[52] U.S. Cl. ......................... 530/378; 426/472; 426/44; 426/46; 514/2
[58] Field of Search ........................... 530/378; 426/472, 426/44, 46; 514/2

[56] References Cited

U.S. PATENT DOCUMENTS

| | | | |
|---|---|---|---|
| 2,732,395 | 1/1956 | Bolley | 260/461 |
| 4,008,334 | 2/1977 | Hansen | 426/46 |
| 4,088,795 | 5/1978 | Goodnight | 426/598 |
| 4,265,925 | 5/1981 | Campbell | 426/641 |
| 4,435,438 | 3/1984 | Lehnhardt | 426/656 |
| 4,697,004 | 9/1987 | Puski | 530/378 |
| 4,863,613 | 9/1989 | Johnson et al. | 210/670 |
| 5,100,679 | 3/1992 | Delrue | 426/44 |
| 5,437,885 | 8/1995 | Lusas et al. | 426/302 |
| 5,658,714 | 8/1997 | Westfall | 530/378 |
| 5,710,365 | 1/1998 | Kerr et al. | 800/200 |

OTHER PUBLICATIONS

Wang, "Mass Balance Study of Isoflavones During Soybean Processing", *J. Agric. Food Chem.*, 44, 2377–2383, (1996).
Johnson, L.A., "Processing Aqueous Extracts of Soybeans by Rapid–Hydration Hydrothermal Cooking", Ph.D. Dissertation, Kansas State University, Manhattan, Kansas, pp. i–ii, 53–54, and 65 (1978).
Johnson, L.A., et al., "Early uses of soy protein in Far East, U.S.", *Inform*, 3, No. 3, pp. 282–290, (Mar. 1992).
Johnson, L.A., et al., "Soy protein's history, prospects in food, feed", *Inform*, 3, No. 4, pp. 429–444, (Apr. 1992).
Leslie, R.B., "The Role of Processing in Changing Protein Characteristics", *J. Am. Oil Chemists' Society*, 56, p. 282, (Mar. 1979).
Rackis, J.J., "Flatulence Caused by Soya and Its Control through Processing", *J. Am. Oil Chemists' Society*, 58, pp. 199–205, (Mar. 1981).
Snyder, H.E., et al., "Chemical Composition", *Soybean Utilization*, Van Nostrand Reinhold Co., publ., New York, NY, p. 59, (1987).
Wilson, L.A., "Soybean Chemical Composition", *Practical Handbook of Soybean Processing and Utilization*, from Soyfoods, Ch. 22; Editor, D.R. Erickson, AOCS Press and United Soybean Board, pp. 430–431, (1995).
"Proceedings of the Fish Meal Substitution Workshop", *The Midwest Feeds Consortium*, Workshop, 62, (Dec. 5, 1994 through Dec. 7).
"Soy Protein Concentrates", *Center for Crops Utilization Research and the Department of Food Science and Human Nutrition*, (1 page), (1994).
"Soy Protein Isolates", *Center for Crops Utilization Research and the Department of Food Science and Human Nutrition*, (1 page), (1994).
"Soy Protein Products–Characteristics, Nutritional Aspects and Utilization", *Soy Protein Council*, Published by Soy Protein Council, pp. i–vii and 1–43, (1987).
"Soybean", *The Academic American Encyclopedia (Electronic Version)*, Grolier, Inc., Danbury, CT, 3, (1992).
Kinsella, J.E., "Functional Properties of Soy Proteins", *J. Am. Oil Chemists' Soc.*, vol. 56, pp. 242–258, (Mar. 1979).
Lawhon, J.T., et al., "Soy Protein Ingredients Prepared by New Processes—Aqueous Processing and Industrial Membrane Isolation", *JAOCS*, pp. 377–384, (Mar. 1981).
Lusas, E.W., et al., "Soy Protein Processing and Utilization", *Practical Handbook of Soybean Processing and Utilization*, Editor, David R. Erickson, pp. 117–160, (1995).
Morr, C.V., "Technical Problems and Opportunities in Using Vegetable Proteins in Dairy Products", *J. Am. Oil Chemists' Society*, vol. 56, pp. 383–385, (Mar. 1979).
Ohren, J.A., "Process and Product Characteristics for Soya Concentrates and Isolates", *JAOCS*, Proceedings of the World Conference on Soya Processing and Utilization, pp. 333–335, (Mar. 1981).
Perkins, E.G., "Composition of Soybeans and Soybean Products", *Practical Handbook of Soybean Processing and Utilization*, Dept. of Food Science, University of Illinois, pp. 9–28, (1995).
Schutte, L., "Flavor Problems in the Application of Soy Protein Materials", *J. Am. Oil Chemists' Soc.*, vol. 56, 2 pages, (Mar. 1979).
Smith, K.J., "Improving the Quality of the Soybean", *JAOCS*, pp. 135–139, (Mar. 1981).

*Primary Examiner*—Cecilia J. Tsang
*Assistant Examiner*—David Lukton
*Attorney, Agent, or Firm*—Schwegman, Lundberg, Woessner, and Kluth, P.A.

[57] ABSTRACT

The present invention provides an economical method to produce an improved soy protein concentrate from soybeans which have been genetically-modified to reduce or eliminate the raffinose, stachyose and lipoxygenase content and associated off-flavors. The improved soy protein concentrate is highly functional, has good palatability and high retention of vitamins, minerals and isoflavones, little or no indigestible oligosaccharides, and is low in fiber such that it can be used in place of soy protein isolates in many applications. Further, the low processing costs of the present invention result in an economical product which offers a superior alternative for lower value uses such as aquaculture diets, pet foods, calf milk replacers, and so forth.

17 Claims, 3 Drawing Sheets

PROCESS FOR PRODUCING IMPROVED SOY PROTEIN CONCENTRATE FROM GENETICALLY-MODIFIED SOYBEANS

This application claims the benefit under 35 U.S.C. 119(e) of U.S. Provisional Application Ser. No. 60/009,512, filed on Dec. 6, 1995.

BACKGROUND OF THE INVENTION

1. Field of the Invention

The present invention rates to an improved method for the purification and concentration of soy protein, and particularly to a method in which genetically-modified soybeans are used to produce an improved soy protein concentrate.

2. Background of the Art

The soybean, *Glycine max*, is a leguminous crop grown in many parts of the world. Soybeans are of great economic importance as a source of edible oil, high-protein foods, food ingredients, and stockfeed, as well as many industrial products. Native to Eastern Asia, the soybean has been used as the chief source of protein for millions of people in the Orient for centuries. It was not until the late 19th century, however, that soybeans began to attract serious attention from Western scientists.

Initially, the primary market for soybeans in the Western World was industrial, causing high demand for the oil to make plastics, adhesives, textile fibers, paper coatings and fire-fighting foams. Later, the demand grew for high-quality soybean meal for use in various animal feeds such as poultry and swine. (Soybean meal is the high-protein residue from the extraction of soybean oil). By the 1930's, the Western market for soy protein substitutes for human consumption began emerging. The United States is now the world's leading producer of soybeans, producing 60–65% of the world crop, with over 56 million acres of soybeans grown each year in the United States. Brazil, China, and Argentina together account for about 33% of the world's production.

Starting in the 1950's, the Western market for soy protein products for human consumption grew tremendously. Today, soybeans are the most abundant source of vegetable protein and oil in the world. The soybean crop of the United States provides over $500 million/year of edible protein products. Soybeans are an important food because they are unusually complete in proteins, with excellent amino acid balance. Soybeans can be eaten as a green or dried bean, and as a constituent in many products including beverages, infant formula, cereals, baked goods, curds, cheese, various sauces, and so forth. Increasingly, soy protein is also being used as a meat substitute.

The term "soy proteins" typically refers to processed, edible dry soybean products other than soybean meals for animals. The three most important considerations in soy protein production are the functionality of the final product, the amount of indigestible oligosaccharides (raffinose and stachyose) present, and the palatability or flavor of the soy protein product. Also affecting the usage of the final product is the amount of fiber present.

Functionality refers to the characteristics which affect protein behavior in various foods during processing, manufacturing, storage and preparation. The level of functionality of a soy protein product is determined by many factors, but in general terms is directly related to the amount of soluble proteins present. Although an insolubilized protein contains basically the same functional groups as a soluble or "native" protein, there is a difference in the "accessibility" of these reactive groups. Hydration is still possible with insolubilized protein, but the resulting product is a suspension rather than a solution. Fat and oil can also be absorbed by insoluble protein, but to a lesser degree than water. Some soy proteins are texturized to absorb fat and produce meat-like texture.

Functional properties of soy protein products include solubility, foaming, emulsification, water absorption and binding, viscosity, gelation, cohesion-adhesion, elasticity, fat absorption, flavor-binding, color control, thermoplasticity, and the ability to form edible films. Depending on the desired final food product, the various functional properties have varying degrees of importance. Successful incorporation of soy proteins into traditional food products such as meat, poultry, seafood, eggs, and dairy products, typically requires the protein ingredient to exhibit characteristics similar to those of the protein being replaced or supplemented.

"*Soy Protein Products*" of the Soy Protein Council and Table 8.8 in Chapter 8, page 152 of the "Practical Handbook of Soybean Processing and Utilization" by D. R. Erickson each discuss functional properties, mode of action, food systems in which those properties are used and products using those properties.

As stated above, water solubility is considered an index of the functional properties of a soy protein as well as an index of the biological and enzymatic activities. Water solubility in soy proteins can be measured by the Nitrogen Solubility Index (NSI). Solubility is important in milk and various other beverages as well as infant formula and liquid animal feed. A highly functional or highly soluble protein product typically has an NSI greater than about 85%. A moderately functional protein product has an NSI of about 60% to about less than 85%, while a poorly functional protein has an NSI less than about 60%.

As with solubility, the various other functional properties indicate the composition of the proteins as well as their interaction with other food components. For example, foaming refers to the ability of the product to form films or to entrap gas and is measured by volume of foam per unit of protein. This function is important in whipped toppings, chiffon desserts and angel cakes. Emulsification is the ability to form and stabilize fat emulsions and is measured by the emulsive capacity of the oil emulsion per gram of protein. This is a quantitative measurement of the ability of the material to support a stable emulsion under identified and standard conditions. This function is required in foods such as sausages, bologna, soups, meat pumping solutions and cakes.

Functionality is also affected by the method used to make a particular product. For example, a soy protein concentrate made with alcohol leaching has a much lower NSI and therefore a lower functionality than a soy protein concentrate made using acid. This is because the protein has been denatured to a greater extent by the alcohol and heat used in the alcohol leaching process. Functionalities may also be modified and improved by adjustment of pH with sodium or calcium bases, application of mechanical stress, and hydrolysis by proteolytic enzymes before drying. Other steps which affect functionality include jet cooking or high pressure homogenization which increase the NSI.

The oligosaccharides raffinose and stachyose are present in soybeans. The concentration of these oligosaccharides are an important consideration in soy protein products because humans and other monogastric animals have difficulty digesting these naturally-occurring carbohydrates. Raffinose is present naturally in soybeans in concentrations of less than one (1)%, while stachyose is present in concentrations of about three (3) to five (5)% by total weight of the dry soybean.

Specifically, monogastric animals lack the enzyme "alpha-galactosidase" necessary to hydrolyze the "alpha-galactosyl" linkages present in raffinose and stachyose to simpler sugars which are absorbable. Instead, the compounds enter the lower intestinal tract fully intact, where they are metabolized by bacteria and actually ferment to produce flatulence and intestinal gas. As a result, no digestible nutrients are obtained and considerable discomfort can result. Many scientists also believe that the presence of oligosaccharides reduces feed efficiency as well.

Palatability or flavor is an important consideration because the natural flavor of a soybean is considered to be an off-flavor or beany-flavor due primarily to the activity of the enzyme lipoxygenase. Lipoxygenase is comprised of three isoenzymes known as lipoxygenase-1, lipoxygenase-2, and lipoxygenase-3. Research is ongoing to determine if lipoxygenase activity is the sole source of the off-flavor or whether other enzymes or flavor compounds in soybeans contribute as well.

It is clear, however, that the "beany" or "painty" flavor of soy proteins is due in large part to lipoxygenase-catalyzed oxidation of linoleic and linolenic fatty acids in the oil. Lipoxygenase is active in the presence of moisture, and unless deactivated will cause obnoxious flavors and odors. Current processes may partially deactivate the lipoxygenase by heating the soybeans. Furthermore, the alcohol used in the alcohol-leaching process to produce soy protein concentrates actually extracts some of the products of the oxidation reaction involving lipoxygenase. In extremely small amounts, however, lipoxygenase is used to bleach bread by the active lipoxygenase action on wheat carotenoids.

Another important consideration in soy protein products is the amount of non-functional fiber present in the final product. Natural soy fiber is derived from the parenchyma cell walls of the soybean. The presence of fiber can bind up the soluble protein, and also prevents a soy product from being used in various applications. Although diets high in fiber are known to have certain nutritional advantages, there are many applications in which fiber is not desirable.

There are numerous other considerations relevant to composition and nutrient content of soy protein products. Such considerations include the presence of trypsin inhibitors which inhibit the digestion of proteins and hemagglutinins (lectins), and which must be heat-inactivated as they otherwise exert negative effects on the nutritional quality of soybean protein. Phytins, which are the insoluble magnesium-, calcium-, and potassium-complexed salt of phytic acid, can bind up protein in the final product. Soybeans also contain goitrogens, the antivitamins D, E and B12, as well as isoflavones, phytoestrogens, saponins, vitamins, minerals, and so forth. Research continues regarding other nutritional and biochemical effects of the soybean which include its cholesterol-lowering ability and anticarcinogenesis.

Soy protein products for human consumption fall into three major groups: Soy flours and grits having 52 to 54% Protein (N×6.25) on a moisture-free basis (mfb), soy protein concentrates containing at least 65% Protein (N×6.25) mfb, and soy protein isolates (or soy proteinates) having a minimum of 90% Protein (N×6.25) mfb. The term "% Protein (N×6.25)" is often used to express the percent of protein in soy protein products to reflect that only part of the nitrogen in soy proteins is of protein origin. The American Oil Chemists' Society (AOCS) conversion factor for soybean protein is N×5.71; however, industry practice is to label protein in soybeans as "Protein (N×6.25)."

Soy flours and grits are the least refined forms of soy protein products used for human consumption and may vary in fat content, particle size, and degree of heat treatment. These products also still contain about five (5) to six (6)% of the oligosaccharides, most of the original lipoxygenase, as well as about 4.3% fiber. As a result, they can only be used in small amounts in various products as otherwise intestinal discomfort and poor flavor become overriding considerations. Soy flours and grits are considered to be "poorly" functional and typically have an NSI less than about 60%.

Soy protein concentrates have much of the indigestible oligosaccharides removed such that the raffinose content is less than about 0.5% and the stachyose content is less than about three (3)%. However, depending on the process used, soy protein concentrates have only poor to adequate flavor, and low to adequate functionality, having NSI's in the range of 15–70%. Additionally, the various processes for producing soy protein concentrates result in a recovery of only about 50% to about 95% of the protein. In every instance, the high cost of such processes limit the use of these products in many areas such as aquaculture diets, poultry diets, and so forth. Furthermore, the presence of approximately four (4)% fiber in soy protein concentrates make them unsuitable for use in certain products such as beverages, milk, and infant formula. The current processes also remove important minerals, vitamins, isoflavones and phytoestrogens along with the low molecular-weight sugars, ash, and minor components.

Soy protein isolates are the most highly refined soy protein products commercially available as well as the most expensive. As with the soy protein concentrates, soy protein isolates are also low in oligosaccharides, having negligible amounts of raffinose and less than two 2(%) stachyose in the final product. Additionally, the isolates have a satisfactory flavor and are highly functional, having a NSI in the range greater than about 85%. Isolates also improve dispersibility and reduce dusting. Both gelling and non-gelling varieties are available as well as various viscosity grades. They possess a low fiber content of less than about 0.3%. As discussed above, it is desirable to remove the fiber in certain products because fiber is non-functional and dilutes protein content. However, as with soy protein concentrates, many of the valuable minerals, vitamins, isoflavones, and phytoestrogens are drawn off to form a waste stream along with the low-molecular weight sugars in making the isolates. Also, the process for producing soy protein isolates yields only about 33% to 50% solids recovery and about 62% recovery of available protein. This extremely low yield along with the many required processing steps contributes to the high costs involved in producing soy protein isolates. As such, their use is prohibitive in many lower value applications including fish food, poultry feed, pet foods, weaning feeds for baby animals, etc.

Soy protein isolates containing a relatively high amount of albumins and other acid soluble proteins have been produced in the laboratory as described in U.S. Pat. No. 4,863,613 to Johnson et al. This patent discloses that the use of absorbable gels results in an economical process for producing soy protein isolates since no acids or alkalis are used and no centrifugation is necessary. However, such a process is not commercially viable not only because the required gel volume for a large-scale operation would be extremely large and cumbersome, but also because their gels have to be regularly replaced, produce a useless by-product, and would otherwise be cost inefficient.

Thus, what is needed is a low-cost and practical method for commercially producing an improved soy protein concentrate having low oligosaccharide content, minimal lipoxygenase activity and/or good flavor, as well as high functionality. Additionally, a soy protein concentrate is needed which retains most of the naturally-occurring vitamins, minerals and isoflavones, but contains little or no fiber.

SUMMARY OF THE INVENTION

The present invention provides a method for producing an improved soy protein concentrate having low raffinose, stachyose; and fiber content, as well as minimal lipoxygenase activity and/or good flavor. These products may also provide high functionality. The improved soy protein concentrate is also high in naturally-occurring vitamins, minerals and isoflavones, and may also be high in phytoestrogens.

Genetically-modified soybeans which are low or devoid in raffinose, stachyose, and lipoxygenase are sorted and cleaned, then cracked, dehulled and processed into defatted soy flakes or soy flour. Soybeans low in oligosaccharides are known in the industry as "low stachyose" soybeans. Those devoid of measurable amounts of lipoxygenase are known as "lipoxygenase null" soybeans. Soybeans which are low in lipoxygenase (e.g., containing two (2) of the three (3) isoenzymes which comprise lipoxygenase) are known as "lipoxygenase-2,3 null." The defatted soy product, known as "white flakes," is extracted with alkali having a pH of about 8–10 to solubilize the protein, sugars and other low molecular weight compounds. The resulting slurry is centrifuged to separate the insoluble fibrous residues from the soluble fraction. The soluble fraction can then be neutralized before it is spray dried to produce a soy protein concentrate having approximately 65–70% protein content, a nitrogen solubility index of at least about 80 to 85%, a fiber content of less than about 0.5%, more preferably less than 0.3% or 0.1%, or even approaching 0%. (For purposes of this patent, the percentage of protein refers to a protein percentage on a "moisture-free basis" and is inclusive of the term "(N×6.25)"). The lipoxygenase activity in the soy protein concentrate of the present invention is expected to be less than ½ (one-half) and even less than about 1/10 (down to 0%) of the lipoxygenase activity found-in normal soy flour as measured by the 2-thiobarbituric acid (TBA) procedure. This is equivalent to an initial rate of reaction of about 0.02 TBA/minute/(mL of 20% soy flour). (The TBA procedure is a widely-accepted method for measuring oxidative changes in foods which contain unsaturated fatty acids). See *"Processing Aqueous Extracts of Soybeans by Rapid-Hydration Hydrothermal Cooking,"* by L. Johnson which is incorporated herein by reference. The product may also contain some of the soluble monosaccharides such as glucose and fructose, or disaccharides such as sucrose. However, these low molecular weight sugars are easily digested and contribute to digestible energy.

The present invention is unlike conventional methods in which alcohol or acid is used to remove the oligosaccharides and "off-flavors" to produce soy protein concentrate. The use of such reagents lowers the functionality of the resulting soy protein concentrate. Also, unlike conventional soy protein concentrates, the soy protein concentrate of this invention is low in fiber, and high in minerals, vitamins, and isoflavones, and may be high in phytoestrogens.

In an alternative embodiment, the soluble fraction can be concentrated by membrane filtration or evaporation prior to drying to reduce drying costs. This step can also help to eliminate some of the color-causing low molecular weight by reducing sugars which might otherwise give the concentrate a slight brownish color.

In another alternative embodiment, the starting material is low or devoid in oligosaccharides only. In this embodiment, an alcohol washing step is added to remove the off-flavor caused by the activity of the enzyme lipoxygenase.

In yet another alternative embodiment, the soluble fraction is not neutralized prior to drying. Prior art processes may provide much more time for microbial growth which will reduce quality, restrict how the product is used or could require the product to be pasteurize. This heat treatment will alter functionality.

The process of the present invention is low in cost and highly efficient, resulting in a high percentage yield. Further, the end-product is cost-effective for use in products such as aquaculture diets, poultry feed, pet foods, and so forth. With the low levels of raffinose and stachyose, as well as the minimal activity of lipoxygenase and/or good flavor in the improved concentrate, there are essentially no problems with indigestibility and palatability. Also, due to the low amount or absence of non-functional fiber, this soy protein concentrate can also be used in products such as milk and beverages which heretofore have required expensive soy protein isolates.

These and other features, aspects, and advantages of the present invention will become better understood with regard to the following description, example, appended claims and accompanying drawings.

DETAILED DESCRIPTION OF THE INVENTION

Soy protein products offer more than just the obvious economic advantages that vegetable proteins have over animal proteins. Advances in soy ingredient technology have resulted in products that can perform many functions in foods such as emulsification, binding, and texture. The acceptance of soy protein products is due, in part, to these and other functional properties. In fact, the current use of soy protein in U.S. foods is based primarily on its functional properties rather than as a supplement for dietary protein.

The traditional processes for making most soy protein products including soy flours and grits, soy protein concentrates or soy protein isolates, all begin with the same initial steps. Soybeans entering a processing plant must be sound, mature, yellow soybeans. The soybeans can be washed to remove dirt and small stones. They are typically screened to remove damaged beans and foreign materials, and may be sorted to uniform size.

Each cleaned raw soybean is then cracked into several pieces, typically six (6) to eight (8), to produce soy chips and hulls. The hulls are removed by aspiration Alternatively, the hulls may be loosened by adjusting the moisture level and mildly heating the soybeans before cracking. Hulls can also be removed by passing cracked pieces through corrugated rolls revolving at different speeds. In these methods, the hulls are then removed by a combination of shaker screen and aspiration.

The soy chips, which contain about 11% moisture, are then conditioned at about 60° C. and flaked to about 0.25 millimeter thickness. The resulting flakes are then extracted with an inert solvent, such as a hydrocarbon solvent, typically hexane, in one of several types of countercurrent extraction systems to remove the soybean oil. Hexane extraction is basically an anhydrous process, as with a moisture content of only about 11%, there is very little water present in the soybeans to react with the protein. For soy flours or grits, protein concentrates and protein isolates, as well as products for industrial uses, it is important that the flakes be desolventized in a manner which minimizes the amount of cooking or toasting of the protein to preserve a high content of water-soluble protein. The industry typically uses vapor desolventizers or flash desolventizers. The flakes resulting from this process are generally referred to as "white flakes." The term "white flakes" is loosely used in the industry to refer not only to enzyme-active flakes (which use the action of lipoxygenase in bleaching wheat flours and conditioning doughs), but also to defatted flakes or meal used for making soy flours, protein concentrates, or protein isolates. See Chapter 8, page 129, lines 4–7 of the "*Practical Handbook of Soybean Processing and Utilization.*" More commonly, however, "white flakes" refer only to food-grade hexane-defatted flakes. Specially designed extractors with self-cleaning, no-flake-breakage features, and the use of a narrow boiling range hexane are recommended for producing white flakes.

The resulting defatted or "white" flake, which is the starting material for most commercial protein ingredients, has a protein content of approximately 50%. Moisture content has typically been reduced by three (3) to five (5)% during this process. Any residual solvent may be removed by heat and vacuum. A typical white flake product may have 80% lipoxygenase (bleaching activity). Often a deodorizing vessel is used to enable live steam to contact the flakes to remove additional residual solvent. Conditions in the deodorizing vessel can be adjusted to produce flakes of varying protein solubility depending on the end-use requirement.

The defatted flakes are then milled, usually in an open-loop grinding system, by a hammer mill, classifier mill, roller mill or impact pin mill into flours or grits with desired particle sizes. Screening is typically used to size the product to uniform particle size ranges, and can be accomplished with shaker screens or cylindrical centrifugal screeners.

Soy flours and grits are made by grinding and screening soybean flakes either before or after the oil removal. As stated above, soy flours and grits are the least refined forms of soy protein product having a protein content of approximately 40% to 54%, a moisture content of about 6–8%, with varying fat content and particle size. They are used in bakery and cereal applications as well as in coarse ground meats, pet foods, and so forth. Since these products still contain oligosaccharides and active lipoxygenase, their use is limited because of digestibility and palatability problems.

Figure 1A:
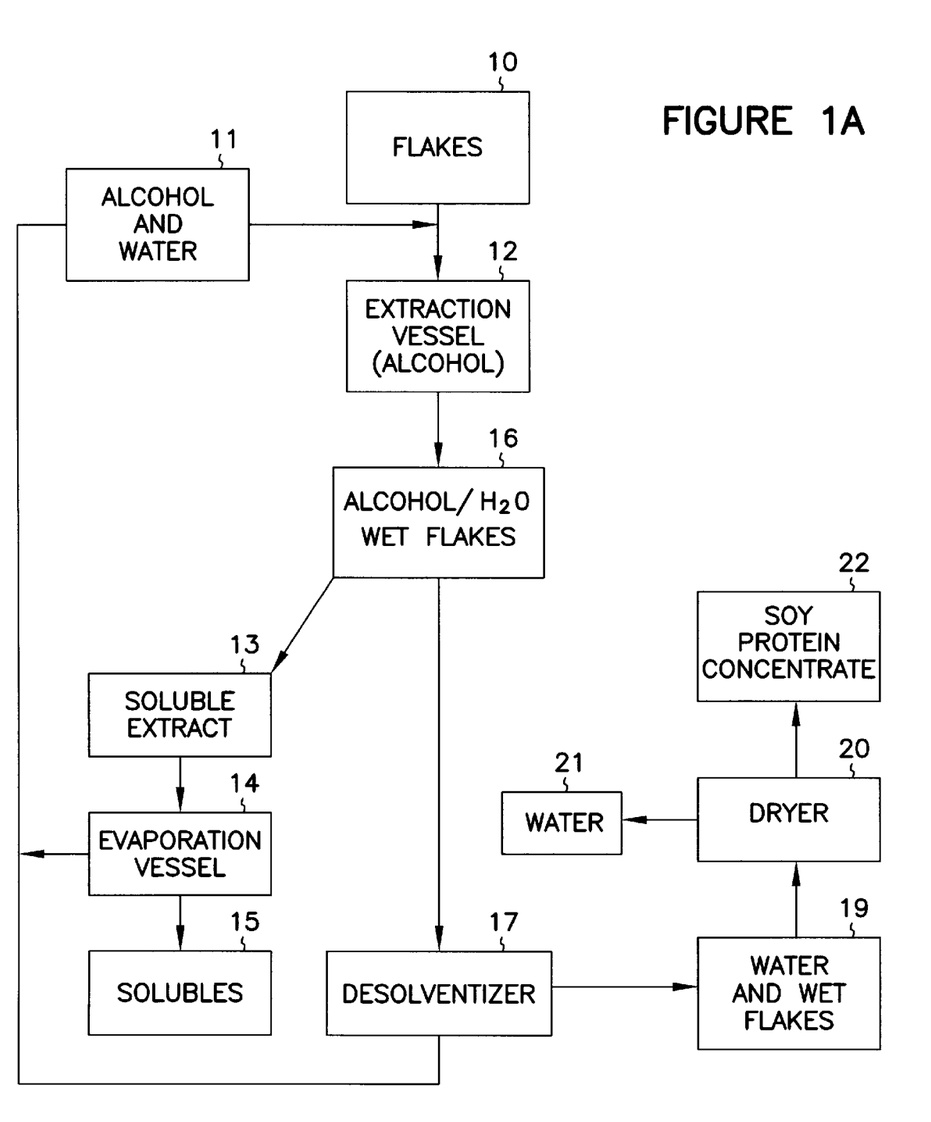
FIG. 1A and 1B are flow diagrams showing two different methods currently used for making soy protein concentrates.

Soy protein concentrates are prepared from dehulled and defatted soy flakes (or flour) by removing most of the water-soluble, non-protein constituents. The "traditional method" for preparing soy protein concentrates is by aqueous alcohol leaching as shown in FIG. 1A. In this method, defatted soy flakes 10 or flour are leached (washed) with alcohol and water 11 in an extraction vessel 12. The alcohol and water 11 is typically 60% to 90% ethanol, and removes much of the soluble sugar, including raffinose and stachyose as discussed above, as well as lipoxygenase-catalyzed off-flavors and odors. The soluble extract 13 containing the alcohol and water and the soy solubles is extracted from the extraction vessel 12 and enters an evaporation vessel 14 where alcohol and water 14 are separated from the solubles 15. The evaporated alcohol and water 11 is recycled from the evaporation vessel 14 for use in the process, while the remaining solubles 15 containing oligosaccharides and flavor compounds, as well as vitamins, minerals, isoflavones, and phytoestrogens are discarded. Wet flakes 16, along with some alcohol and water, also exit the extraction vessel 12 and enter a desolventizer 17. Sufficient heat is used in the desolventizer 17 to increase the vapor pressure of the alcohol and water 11 to remove that liquid, but is sufficiently low to minimize cooking of the protein. The application of reduced pressures over the liquid bearing mass also increases the rate of removal of the liquid. Alcohol and water 11 reclaimed from the desolventizer 17 are recycled for use in the extraction vessel 12.

The remaining water and wet flakes are dried in a dryer 20 to remove water 21 and to produce soy protein concentrate 22 having a moisture content of about four (4) to six (6)%, but possibly as high as 7.5%, a soluble protein content of about ten (10)% a NSI of about five (5) to ten (10)%, and a fiber content of about 3.4 to 4.8%. The functionality and nitrogen solubility are low because the protein has been extensively denatured from the alcohol extraction and heat during desolventization. The high temperatures, however, are needed to inactivate unwanted components, including trypsin inhibitors proteins and glycoproteins. Trypsin inhibitor proteins act as protease inhibitors and antigrowth factors by restricting protein digestion in monogastric animals, which can lead to enlargement of the pancreas. Glycoproteins, also known as hemagglutinins (lectins) are suspected of exerting a negative effect on the nutritional quality of soybean protein.

The yield from this process is about 50–95% of available protein, and the raffinose and stachyose content have been reduced to about 0.1 to 0.3% or less and 0.03 to 0.5% or less, respectively. Further, the lipoxygenase activity is thought to be about ½ or ¹⁄₁₀th or less of the lipoxygenase activity found in normal soy flour such that the initial rate of reaction is about 0.02 TBA/minute/(mL of 20% soy flour).

More recently, secondary treatments such as high pressure homogenization or jet cooking are used to restore some solubility lost during processing. The resulting product is a soy protein concentrate having a soluble protein content of approximately 65–75% and an NSI of about 75%. Jet cooking may further deactivate lipoxygenase and trypsin inhibitors which are present. However, these secondary treatments are very expensive and the resulting product has a relatively bland flavor.

Figure 1B:
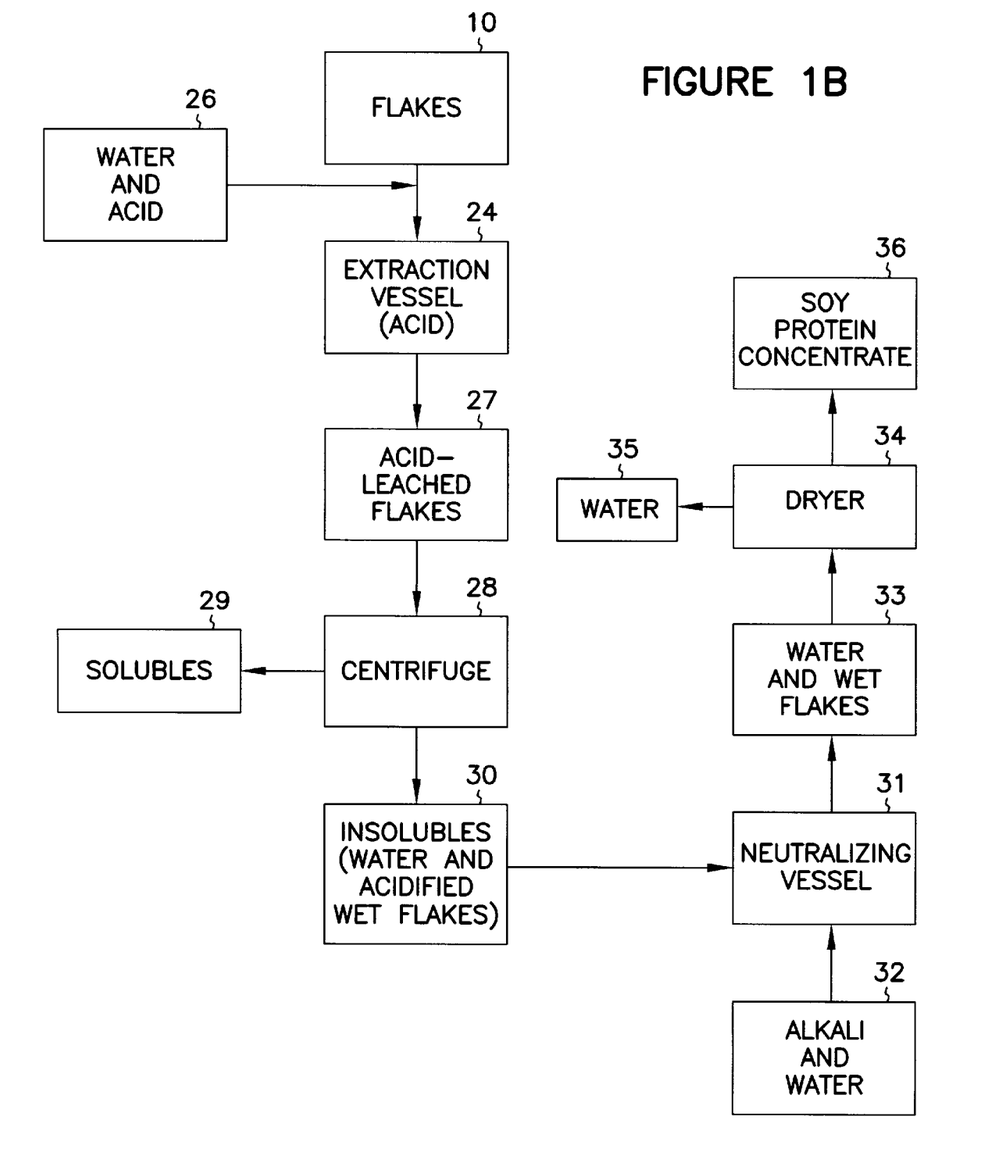

Another less used method for producing soy protein concentrates is by acid leaching as shown in FIG. 1B. Flakes 10 enter an extraction vessel 24 in which water in a ratio of about 10 to 20:1 water to defatted flakes or flour is combined with a food-grade acid (water plus acid) 26, typically hydrochloric acid, to adjust the pH to about 4.5. The extraction typically runs for about 30 to 45 minutes at about 40° C. (104° F.). The acid-leached flakes 27 then enter a centrifuge 28 (or decanter) to concentrate the solids to about 20%. A second leach and centrifugation may also be employed. The solubles 29 containing the oligosaccharides and flavor compounds, as well as vitamins, minerals, isoflavones, and phytoestrogens are removed by the centrifuge 28 and discarded. The insolubles 30 containing water and acidified wet flakes enter a neutralization vessel 31. The insolubles 30 may be dried in acidic form, but are usually first neutralized in the neutralization vessel 31 to a pH of about 7 with alkali and water 32 (e.g., sodium hydroxide or calcium hydroxide) to produce neutralized water and wet flakes 33. The neutralized water and wet flakes 33 enter a dryer 34 in which the wet flakes are spray dried at about 157° C. (315° F.) inlet air temperature and 86° C. (187° F.) outlet temperature to remove water 35 and to produce soy protein concentrate 36 having a protein content of about 65–70%. The yield from this process is about 50–95% of available protein, and the raffinose and stachyose content have been reduced to 0.1 to 0.3% or less and 0.3 to 0.05% or less, respectively. Furthermore, the lipoxygenase activity is thought to be about ½ or less of that found in normal soybean flour. Thus the initial rate of reaction is about 0.1 TBA/minute/(mL of 20% soy flour).

The end product is "moderately" functional due to only a partial protein denaturation from acid exposure The end product also has a lower ash content when prepared by acidic extraction indicating a more thorough removal of minerals. About five (5) to ten (10)% of the carbohydrates remaining in soy protein concentrates after leaching are soluble sugars, ash, and minor components with the balance being insoluble polysaccharides. The end product also has a higher water-soluble protein content (about 70–75%) and a higher NSI (70–80%) than achieved with alcohol leaching. However, the end product contains about 3.5–4.8% fiber and has a poor or off-flavor from the presence of active lipoxygenase, unless the product is jet cooked as discussed above.

Soy protein concentrates can function as emulsifiers and emulsion stabilizers, they bind fat and water, and also offer special adhesive properties similar to those of isolates. The concentrates are used in various applications requiring a low-flavor profile, water and fat absorption and emulsification (dispersible form). The concentrates are also used in products such as meat patties, pizza toppings, and meat sauces and in conditions that stress the product, such as freeze-thaw cycles and extended holding times of precooked or cooked products. Further, soy protein concentrates contain the polysaccharides arabinogalactan and arabinan, as well as acidic polysaccharide which are highly water absorbent. Processing conditions can be varied to achieve varying levels of absorbability and to also vary how tightly the water is bound by the protein in the finished food products.

Soy protein isolates are typically produced by a different method. The protein is first extracted from defatted soybean flakes with water or mild alkali having a pH of about 8.2–9 in an extraction tank. The extracted soybean flakes enter a first centrifuge to separate the soluble fraction from the insoluble fibrous residue. The resulting soluble fraction (containing extracted protein and oligosaccharides) is acidified to a pH of about 4.5 in an acidification tank in the presence of food-grade acid. Typically hydrochloric acid is used in this step to precipitate the protein as a curd. A second centrifuge is used to separate the whey (which includes the soluble oligosaccharides) from the protein curd. The curd is then washed with water in a washing tank using any number of multiple washings. The washed curd is commonly neutralized to a pH of about 7 with water and an alkali such as sodium or calcium hydroxide in a neutralization tank to make the product pH neutral. Neutralization of the soy protein improves the quality of the finished foods made with this soy protein product, and prevents the product from tasting alkaline or acidic. (Soy protein products which are intended for industrialized use do not need to be neutralized and can be dried at this point and used as an isoelectric isolate. For such non-food and non-feed uses, the soy protein may instead be dissolved in an alkali to make an alkaline dope which destroys the three-dimensional structure of the proteins and allows the proteins to unfold and realign for better fibers or films). The neutralized curd is spray dried in a dryer at about 157° C. (315° F.) inlet air temperature and 86° C. (187° F.) outlet temperature to yield the soy protein isolate or soy proteinate having a moisture content of about four (4) to six (6)% and a soluble protein content greater than about 90%.

The lipoxygenase activity in isolates is thought to be about ½ of the lipoxygenase activity found in normal soy flour such that the initial rate of reaction is about 0.1 TBA/minute/(mL of 20% soy flour), unless subjected to jet cooking where it may be rendered to almost zero (0).

Only about 33–50% of the starting flakes or flour are recovered as a spray-dried powder. Neutralized isolates account for approximately 90% of isolate usage in such applications as meat and dairy products, as well as in other applications requiring emulsification, emulsion stabilization, water and fat absorption, adhesive or fiber-forming properties and food analogs.

The drawbacks of this method include the high cost involved in all of the separation steps. Also, by exposing the soy protein to acid and alkali, the protein is partially denatured and contains relatively high levels of salt due to the acid and alkali treatments, unless desalted by the use of membranes. The unprecipitated protein present in the whey represent about 10% of the dispersible proteins present in the mother liquor. Such loss includes albumins and other acid soluble proteins which are known for their high content of essential amino acids and excellent functional properties. This failure to recover a substantial percentage of the available and valuable protein in the soybeans reduces the utility of the existing process. More importantly, the loss of these proteins can compromise the functional and nutritional quality of the final product by affecting the overall protein and amino acid compositions.

Another method to purify and concentrate soy proteins to produce soy protein isolates in the laboratory involves the use of a solid cross-linked polymer gel such as gels from cross linked N-substituted polyacrylamides and copolymers of N-substituted polyacrylamides. These gels exhibit certain phase transition characteristics which result in a higher recovery of proteins, less bacteria, and less phytin. Specifically, the gel absorbs a portion of the water and other soluble moieties including low molecular weight sugars, salts, and phytins to produce a yield of at least 80% of the available protein. The concentrated soy protein solution is then separated from the swollen gel. The final product is high in albumins and other acid soluble proteins normally lost in the conventional process for producing soy protein isolates. The gel processes can be run at relatively cool temperatures, thereby reducing concerns regarding microbial population.

The improved soy protein concentrate of the present invention uses soybeans which have been genetically-modified to have low levels of raffinose and stachyose. Preferably the combined total level of the oligosaccharides in the starting material is 1.5% or less, more preferably 0.95% or less, still more preferably 0.60% or less and most preferably 0.3% or less down to 0%, but can be as high as 2.5% and still be an improvement over the natural occurring levels of these oligosaccharides. In a more preferred embodiment, the starting material has low levels of both oligosaccharides and is devoid in measurable amounts of lipoxygenase.

In the most preferred embodiment, Dupont soybeans known as "Lipox null" soybeans are used as the starting material. The Dupont soybeans can be obtained form Optimum Quality Grains in Des Moines, Iowa.

Soybeans naturally contain approximately 1.0% raffinose and approximately 3.0 to 5.0% (e.g., again measured at 4.6%) stachyose with a trace of glucose and other minor components. The starting material for the present invention has had most of the stachyose and raffinose replaced with sucrose, by other easily digested sugars or by known genetic replacement techniques in the beans themselves. Alternatively, the photosynthesis can be shifted to produce soybeans having no sucrose and elevated levels of protein and/or oil.

Figure 2:
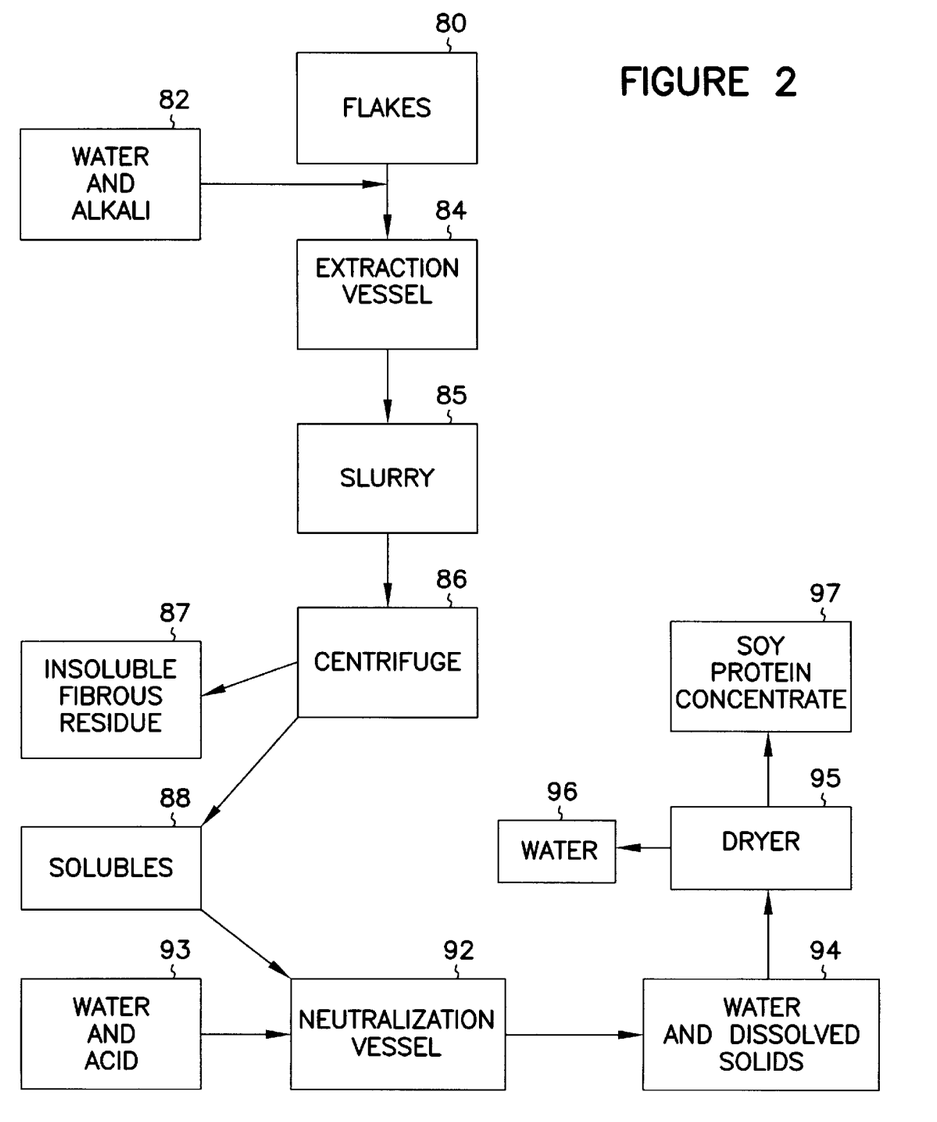
FIG. 2 is a flow diagram of one embodiment of the process of the present invention.

The genetically-modified soybeans are harvested, cleaned, dehulled and defatted as described above. As shown in FIG. 2, the resulting defatted flakes 80 (or flour) are extracted with alkali and water 82 in an amount sufficient to solubilize the protein, sugars, and other low molecular weight compounds from the insoluble fiber. Preferably alkali hydroxides (e.g., calcium, sodium or potassium) are used as the alkali having a pH of 8–10. The extraction step is completed in an extraction vessel 84 having any suitable number of stages, such as one, two, or three stages. More stages extract more protein and isoflavones, and other components desirable in the final product, but also increase the costs of the operation. The temperature is kept at about 60° C. at ambient pressures to maximize the solubility of the protein while minimizing the denaturing of the protein.

The resulting slurry 85 enters a centrifuge 86 to separate the insoluble fibrous residue 87 from the solubles 88. The slurry 85 is centrifuged continuously during this process.

In one embodiment, the insoluble fibrous residue 87 exits the centrifuge 86 and the soluble fraction 8 is neutralized in a neutralization vessel 92 with water and acid 93 to produce water and acid flakes 94 which are pH neutral. Neutralization improves the quality of the finished foods, and prevents the product from tasting alkaline or acidic. Neutralization can be effected with an acid, such as 1N hydrochloric acid. For the approximately 10% of soy protein products which are targeted for industrial use such as plastics, adhesives, glycerin, paints, soaps, linoleum, rubber substitutes, and printing ink, no neutralization is necessary as discussed above, and the protein may alternatively be dissolved in an alkali.

The neutralized water and solubilized soy protein concentrate solids (dissolved solids) 94 are spray dried momentarily in a suitable dryer 95 to remove water 96. In one embodiment, a rotary disk is used to atomize the fluid in the air stream.

The resulting soy protein concentrate 97 has a protein content of about 60% to about 80% of available protein. Further, the improved soy protein concentrate of the present invention contains less than 0.3% fiber since the fiber is insoluble and little is extracted with the alkali. Also, since it is not necessary to use any alcohol or acid to produce the improved soy protein concentrate, the final product has not been denatured and is highly functional. As a result, this improved soy protein concentrate can be used in many applications previously not considered possible for soy protein concentrates.

In yet another alternative embodiment, when Lipox-Null beans are not used, dissolved solids of the present invention are jet cooked for about 10 seconds to 2 minutes at about 100 to 160° C. prior to drying to deactivate any lipoxygenase or trypsin inhibitors.

In an alternative embodiment, the soluble fraction 90 exiting the centrifuge 86 enters the dryer 94 without being neutralized.

In another alternative embodiment, membrane filtration is used to concentrate the solids of the extract to about 20% to reduce drying costs, and at the same time reducing the sucrose and phytin content. In this embodiment, however, the level of isoflavones, vitamins, minerals, and possibly phytoestrogens may be lower.

The improved soy protein concentrate will have properties previously achieved only in soy protein isolates including solubility, gelation, emulsification, dispersibility, viscosity and retort stability. The Nitrogen Solubility Index (NSI) is at least 80%, preferably greater than 95%. The emulsion capacity can vary from 10 to about 35 milliliters of oil per 100 milligrams of protein. This concentrate has water absorption values of up to 400%. The moisture content of the final product is about 6 to 8%, and the bleaching activity of the lipoxygenase in the final product is expected to be about less than ½ of the lipoxygenase activity found in soy flour such that the initial rate of reaction is less than about 0.1 TBA/minute/(mL of 20% soy flour). The activity may be less than $\frac{1}{10}$ or even down to zero of the lipoxygenase activity found in normal soy flour.

Furthermore, this soy protein concentrate can gel under certain conditions and also has both emulsifying and emulsion-stabilizing properties. It is an excellent fat and water binder, and a good adhesive agent.

Furthermore, since the starting material is preferably low in raffinose, stachyose and lipoxygenase, the soy protein concentrate is very digestible and has good palatability. Some sugars such as sucrose, fructose and glucose remain in the final product. These low molecular weight sugars are easily digested, however, and contribute to digestible energy.

The final product is also high in water-soluble minerals, proteins and isoflavones, and may be higher in phytoestrogens. Isoflavones, which exist in the plant as glycosides are important because they are widely considered to be anticarcinogensic. Phytoestrogens are currently being studied for their possible use in the treatment of menopausal symptoms.

The final product is also lower in salt than either acid washed soy protein concentrate or isoelectric soy protein isolate, since salt is produced in these processes when the isolates are neutralized to a pH of about 7.

In an alternative embodiment, the starting material is only low in raffinose and stachyose. In this case, the concentrate produced by our method would contain the usual flavor of acid-washed soy protein concentrate and soy protein isolate, but would have a higher functionality than is achieved with current acid-washed processes.

In another alternative embodiment, the soluble protein-rich fraction is concentrated before drying to reduce drying costs. Concentration can be achieved by membrane filtration or by evaporation. One advantage of the use of membrane filtration is that it helps to reduce the amount of low molecular-weight sugars which can cause a brown or off-color.

The invention will be further described by reference to the following example which is offered to further illustrate another embodiment of the present invention. It should be understood, however, that many variations and modifications may be made while remaining within the scope of the present invention.

EXAMPLE 1

Dehulled, defatted soybean white flakes (0.5% fat, 50% protein db) are prepared from low oligosaccharide soybeans by hexane extraction technologies that are well known to the industry, such as cracking, aspirating to remove hulls, conditioning by heating to 60° C., flaking to 0.25 mm thickness, extracting in six stages with warm fresh hexane (65° C.) in an extractor-simulator (French Oil Mill Machinery), and air desolventizing under slight negative pressure but no heat (industry would use vapor desolventizing or flash desolventizing, where some heat is used for very short periods). About 20 kg of white flakes are extracted in two stages with alkali. In the first stage, the white flakes are mixed for 30 minutes with 300 kg of warm water (60° C.) in a stirred vessel (stainless steel tank) maintained at 60° C. by circulating warm water through the tank jacket. The slurry is adjusted to pH 8.2 with sodium hydroxide to solubilize the protein, sugars, isoflavones and other soluble components, but not the fiber. The slurry is centrifuged in a horizontal, decanter-type, continuous centrifuge (Sharples p660) to separate the insoluble fiber fraction (predominantly fiber) from the soluble fraction (predominantly protein). The insoluble solids fraction is re-extracted with 100 kg of alkali as was done the first (pH 8.2, 60° C.) to more completely extract the protein and other soluble components. The second slurry is also centrifuged as in the first extraction stage to separate the solubles (predominantly protein) from the insoluble fiber. The two soluble fractions are combined, neutralized to pH 7.0 with 1N hydrochloric acid, and spray dried (inlet air temperature 160° C., outlet air temperature 85° C.) to produce a dry, flowable powder.

The resulting protein powder contains more than 60% protein (db). Most of the original sugars and isoflavones are present in our protein concentrate. Approximately 66% of the solids in the original soybean white flakes and 80% of the protein are recovered in the spray-dried solids (this compares to about 33% of the solids and 62% of the protein recovered in conventional protein isolates). All of the functional properties (i.e. solubility, emulsification, foaming, etc.) of a soy protein isolate are present in our soy protein concentrate.

EXAMPLE 2

Dehulled, defatted soybean with white flakes (0.5% fat, 50% protein db) are prepared from soybeans with combined traits of low oligosaccharide content and lipoxygenase null (absent of any of the three lipoxygenase iso-enzymes). Methods described in Example 1 are used to prepare the white flakes.

About 20 kg of white flakes are extracted once with 400 kg alkali by mixing the flakes with water (60° C.) for 30 minutes in a stirred vessel (stainless steel tank) maintained at 60° C. The mixture is adjusted to pH 8.2 to solubilize the protein, sugars, isoflavones and other soluble components, but not the fiber. The slurry is centrifuged in a horizontal, decanter-type, continuous centrifuge (Sharples p660) to separate the insoluble fiber fraction (predominantly fiber) from the soluble fraction (predominantly protein). The insoluble fraction is discarded. The alkali soluble fraction is clarified using a disk-type, desludging, continuous centrifuge (Alpha Laval BPTX 205) and neutralized to pH 7.0 with 1N hydrochloric acid. The neutralized extract is spray dried (inlet air temperature 160° C., outlet air temperature 85° C.) to produce a dry, flowable powder.

The resulting protein powder contains more than 60% protein and is bland in flavor. Most of the sugars and isoflavones are present in our protein concentrate. All of the functional properties (i.e. solubility, emulsification, foaming, etc.) of soy protein isolate are present in our protein concentrate. Approximately 66% of the original soybean white flake solids and 80% of the protein are recovered in the spray dried solids (this compares to about 33% of the solids and 62% of the protein recovered in conventional protein isolates).

EXAMPLE 3

Techniques known in the industry as "aqueous extraction of whole soybeans" can be used without preparing defatted white flakes. Whole soybeans, low in oligosaccharides and absent of lipoxygenase (lipoxygenase null), are ground in a pin mill (Bauermister pin mill). About 20 kg of full-fat soybean flour (20% fat, 40% protein db) is mixed with 240 kg of alkali (calcium hydroxide) at pH 9.0 and 60° C. for 30 minutes. The aqueous slurry is then centrifuged in three-phase centrifuge (disk-type, desludging, continuous centrifuge, Alpha Laval BPTX 205) to produce a soluble aqueous phase, a solids residue phase and an oil/emulsion phase. The solids phase is re-suspended for a second extraction (100 kg alkali) at pH 9.0, 60° C. The slurry is re-centrifuged as in the first stage. Fractions are combined. The solids are discarded and the oil/emulsion is broken to recover crude oil (as described by Lawhon et al. 1981) which would be vacuum dried before sending to a vegetable oil refinery. The aqueous phase is neutralized with 1N hydrochloric acid and spray dried (inlet air temperature 160° C., outlet air temperature 85° C.) to produce a dry flowable powder.

The resulting protein powder contains 66% of the original full-fat soybean flour solids, and 60–80% of the protein. (This compares to about 33% of the solids and 62% of the protein recovered in conventional protein isolates). The protein concentrate of the present invention also has a sweeter flavor than soy protein concentrates and isoelectric protein isolates prepared by conventional methods. Most of the sugars and isoflavones are present, as well as much of the phytoestrogens.

The above process offers a low cost alternative to producing soy protein concentrates which have improved properties including higher functionality and low fiber content. In the preferred embodiment, there is no need to use expensive alcohol or acid in order to remove the raffinose or stachyose or inactivate the lipoxygenase or extract as in the ethanol method, as the starting material is already low or devoid of these constituents.

This process is less harsh and little or no protein denaturation occurs, because there are no protein precipitation, or acid or ethanol washing steps. Therefore the native properties (i.e. inherent functionalities) of the soybean such as solubility and emulsification are not altered. The product is similar to a protein isolate, and contains at least all of the functional properties of a soy protein isolate, but may be superior in certain functional and taste properties because the product of the present invention has not been exposed to acid. Furthermore, the acid soluble proteins, which are lost with the whey in the existing processes are retained and concentrated in this process. Because these soluble proteins include albumins and other species which functionally and nutritionally improve the quality of the final product, this process is substantially better than existing extraction processes because of improved product quality and increased yield.

As stated above, in the United States, soy protein products currently are sought after mainly as functional food ingredients rather than for supplementing dietary protein. Therefore, it is the functionality of the final product, rather than its protein content, which is important in many applications.

For example, concentrated and isolated soy proteins are used primarily as functional ingredients in meats. In emulsified meats or comminuted luncheon meats, soy proteins are used to promote emulsification, gelation, and fat- and water-binding. Whole meat cuts can also be augmented with soy protein. Soy protein concentrates are used in baked products, breakfast cereals, and calf milk substitutes. Protein concentrates can be textured for use as meat extenders. Protein isolates also are often used in dairy analogs, baby foods, infant formulas and for spinning into edible fibers.

The product of the present invention will also have less salt because less pH adjustment is required. The waste water also needs less treatment because of the lower salt load and lower BOD (biological oxygen demand). The final product may also have less phytins.

The final product is also high in water-soluble minerals, proteins and isoflavones. Isoflavones, which exist in the plant as glycosides, are important because they are widely considered to be anticarcinogenic. However, since the process of the present invention recovers the solubles, the final product is expected to be much higher in isoflavones than is found in the current product produced with conventional methods in which the solubles are discarded.

Regarding phytoestrogens, as compared with ethanol-washed soy protein concentrate and isoelectric-precipitated soy protein isolates made in the conventional manner, the product of the present invention would contain much higher levels of phytoestrogens. It is estimated that the final product of the present invention would have approximately ⅓ to ½ of the original phytoestrogens found in soybeans.

The present invention provides new uses for soy protein concentrates. The improved soy protein concentrates of the present invention can be used not only everywhere soy protein concentrates are used, but also everywhere soy protein isolates are used because these concentrates contains little or no fiber (for example, less than 0.5% by weight of fiber, preferably less than 0.1% by weight of fiber, or even 0% by weight of fiber). Such products include milk and beverages, and many others.

Furthermore, since the process is so inexpensive, the process and product of the present invention have applicability in markets never before possible including aquaculture diets as a fish meal substitute, poultry feed, pet food additives, calf milk replacers, cereals, and baking ingredients.

U.S. Pat. No. 4,863,613 describes the preparation of soy isolate (>90% protein); the product of the present invention is a concentrate (>60% protein, by estimates, but higher concentrations should be available). However, the product of the present invention does not need the gel treatment which is expensive and time consuming to carry out. The process of the present invention is much simpler, yet does not have the usual disadvantages of having soybean oligosaccharides present. Thus, other than a slightly lower protein content, we achieve most of the properties of an isolate without the added expense of isoelectric precipitation or gel treatment. Membrane filtration, like that practiced in U.S. Pat. No. 4,863,613 could be used in combination with the process of the present invention, but with merely higher protein concentration achieved at significantly higher cost.

The gel treatment is to remove the oligosaccharides which cause flatulence. Because we have genetically reduced or eliminated oligosaccharides and increased sucrose, there is little advantage or need to remove sugars. There are little or no sugars in our product to cause flatulence. Sucrose, which is present in our product at higher levels than normal, do not have any detrimental effects. Sucrose is the same as table sugar that is often added to foods.

The invention process is simpler, requiring less energy, labor, material and capital as is required in conventional processing. No alcohol is used and there is no need for explosion-proof equipment. There should be no problems in using a controlled solvent such as ethanol.

When the process of the present invention uses soybeans containing lipoxygenase, the flavor properties are about the same, although functional properties should be improved and the product contains little or no fiber. When "lipoxygenase null" soybeans with low oligosaccharide traits are used, better flavor as well as high functionality and low fiber is achieved.

Although the present invention has been described in considerable detail with reference to certain preferred versions thereof, other versions are possible. For example, soybeans which are low in oligosaccharides and have an altered amino acid composition or an altered fatty acid composition can be used as the starting material. Such starting material can include soybeans having a high oleic acid content or a low linolenic acid content, a low saturated fatty acid content or high saturated fatty acid content, a high isoflavone content, and so forth. Therefore, the spirit and scope of the appended claims should not be limited to the description of the preferred embodiments contained herein.

What is claimed is:

1. A process for producing an improved soy protein concentrate comprising the steps of:
providing soy flakes derived from soybeans, the soybeans having been genetically modified to have a raffinose content of less than 1.0% and a stachyose content of less than about 3.0% wherein the raffinose and stachyose contents are based on a total dry weight of the soybeans;
extacting protein from the soy flakes with water and alkali to produce a slurry having a soluble protein function and an insoluble fibrous residue;
separating the insoluble fibrous residue from the soluble protein fraction; and
drying the soluble protein fraction to produce a soy protein concentrate having about the same amount, by weight, of raffinose and stachyose originally present in the genetically modified soybeans, a fiber content of less than about 0.5% by weight, a nitrogen solubility index not less than 80%, and a protein content (N×6.25) of not less than 60% db, wherein neither alcohol or acid is used to extract the protein or remove raffinose and stachyose, further wherein acid is not used to precipitate the protein as a curd.

2. The process of claim 1 wherein the soy flakes are defatted soy flakes derived from soybeans having a raffinose content less than about 0.3%, a stachyose content less than about 0.3%, and a lipoxygenase activity of less than about ½ that of normal, genetically-unmodified soy flour.

3. The process of claim 1 further including neutralizing the soluble fraction with acid to produce a pH-neutral product, without denaturing more than 5% by weight of the fraction.

4. The process of claim 2 wherein the alkali used in the extracting step has a pH of about eight (8) to ten (10).

5. The process of claim 1 wherein the total level of raffinose and stachyose in the soybeans is less than 0.95%.

6. The process of claim 1 further comprising the step of concentrating the soluble protein fraction by evaporation or membrane filtration.

7. The process of claim 1 wherein the soy flakes are defatted soy flakes derived from soybeans having a raffinose content less than about 0.3% and a stachyose content less than about 0.3%.

8. The process of claim 1 wherein the soluble protein fraction is jet-cooked for about 10 seconds to 2 minutes prior to drying.

9. A process for producing a soy protein concentrate comprising the steps of:

providing soy flakes derived from soybeans which have been genetically modified to contain a combined total level of oligosaccharides of 2.5% or less, wherein the oligosaccharide content is based on a total dry weight of the soybeans;

extracting protein from the soy flakes with alkali to produce a slurry having a soluble protein fraction and an insoluble fibrous residue; and separating the insoluble fibrous residue from the soluble protein fraction; and drying the soluble protein fraction to produce a soy protein concentrate having about the same amount, by weight of oligosaccharides originally present in the genetically modified soybeans, and a protein content (N×6.25) of not less than 60% db, wherein neither alcohol or acid is used to extract the protein or remove the oligosaccharides, further wherein acid is not used to precipitate the protein as a curd.

10. The process as recited in claim 9 wherein the soluble protein fraction is jet-cooked prior to drying to deactivate any lipoxygenase or trypsin inhibitors which are present.

11. The process as recited in claim 9 further wherein the soybeans are also low or devoid in measurable amounts of lipoxygenase.

12. The process as recited in claim 11 wherein the soy protein concentrate has minimal lipoxygenase activity.

13. The process as recited in claim 9 further wherein the soy protein concentrate is high in mineral, vitamin and isoflavone content.

14. The process as recited in claim 9 wherein the soybeans contain phytoestrogens, further wherein the soy protein concentrate has approximately ⅓ to ½ of the original phytoestrogens found in the soybeans.

15. The process as recited in claim 9 further wherein the soy protein concentrate has a nitrogen solubility index (NSI) of at least 80%.

16. A process for producing a soy protein concentrate comprising the steps of:

grinding soybeans to produce full-fat soybean flour, wherein the soybeans have been genetically modified to have a raffinose content of less than 1.0% and a stachyose content of less than about 3.0% wherein the raffinose and stachyose contents are based on a total dry weight of the soybeans;

mixing the full-fat soybean flour with alkali to produce a slurry having a soluble protein fraction, an insoluble fibrous residue and an emulsion phase, wherein the emulsion phase contains oil; and separating the insoluble fibrous residue and the emulsion phase from the soluble protein fraction; and drying the soluble protein fraction to produce a soy protein concentrate having about the same amount, by weight of raffinose and stachyose originally present in the genetically modified soybeans, and a protein content (N×6.25) of not less than 60% db, wherein neither alcohol or acid is used to extract the protein or remove the raffinose and stachyose, further wherein acid is not used to precipitate the protein as a curd.

17. The process as recited in claim 16 wherein the soy beans are also low or devoid in measurable amounts of lipoxygenase.

* * * * *

UNITED STATES PATENT AND TRADEMARK OFFICE
CERTIFICATE OF CORRECTION

PATENT NO. : 5,936,069
DATED : August 10, 1999
INVENTOR(S) : Lawrence A. Johnson It is certified that error appears in the above-identified patent and that said Letters Patent is hereby corrected as shown below:

In column 9, line 15, delete "acid exposure", insert --acid exposure.-- therefore.
In column 17, line 22, delete "weight of", insert --weight, of-- therefore.
In column 18, line 15, delete "3.0% wherein", insert --3.0%, wherein-- therefore.
In column 18, line 26, delete "weight of", insert --weight, of-- therefore.
In column 16, line 34, delete "3.0% wherein", insert --3.0%, wherein-- therefore.
In column 16, line 38, delete "protein function", insert -- protein fraction-- therefore.
In column 5, line 15, delete "stachyose;", insert --stachyose,-- therefore.

Signed and Sealed this

Twenty-ninth Day of February, 2000

Attest:

Attesting Officer

Q. TODD DICKINSON

Commissioner of Patents and Trademarks